US011515836B2

(12) United States Patent
Sagong

(10) Patent No.: US 11,515,836 B2
(45) Date of Patent: Nov. 29, 2022

(54) COMPLEX ENERGY GENERATION DEVICE USING SUNLIGHT AND SOLAR HEAT

(71) Applicant: KUKDONG ENERGY Corp, Gyeongsangbuk-do (KR)

(72) Inventor: Myeong Geon Sagong, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 0 days.

(21) Appl. No.: 17/395,470

(22) Filed: Aug. 6, 2021

(65) Prior Publication Data

US 2022/0216827 A1   Jul. 7, 2022

(30) Foreign Application Priority Data

Jan. 7, 2021   (KR) .......................... 10-2021-0001871

(51) Int. Cl.
*H02S 40/44* (2014.01)
*H02S 40/42* (2014.01)
*F24S 80/30* (2018.01)
*F24S 10/50* (2018.01)
*F24S 20/00* (2018.01)
*F24D 11/00* (2022.01)

(52) U.S. Cl.
CPC .............. *H02S 40/44* (2014.12); *F24S 10/50* (2018.05); *F24S 80/30* (2018.05); *H02S 40/425* (2014.12); *F24D 11/003* (2013.01); *F24S 2020/17* (2018.05)

(58) Field of Classification Search
CPC ....... H01L 31/00–078; Y02E 10/50–60; H02S 10/30; H02S 20/00–32; H02S 40/40–44
See application file for complete search history.

(56) References Cited

U.S. PATENT DOCUMENTS

| | | | | |
|---|---|---|---|---|
| 4,505,261 | A * | 3/1985 | Hunter ................ | F28D 15/0275 126/588 |
| 8,459,250 | B2 * | 6/2013 | Lowenstein ............ | F24S 10/95 126/635 |
| 9,170,057 | B2 * | 10/2015 | Crawmer ................ | F24S 80/30 |
| 2010/0108055 | A1 * | 5/2010 | Davis ...................... | F24S 10/45 126/663 |

(Continued)

FOREIGN PATENT DOCUMENTS

| AU | WO2014075127 | * | 5/2014 |
|---|---|---|---|
| CN | 101038109 | * | 9/2007 |
| CN | 200958870 | * | 10/2007 |

(Continued)

*Primary Examiner* — Bach T Dinh
(74) *Attorney, Agent, or Firm* — Revolution IP, PLLC

(57) ABSTRACT

A complex energy generation device includes: a heat storage tube having an inlet portion into which heat medium oil flows, and an outlet portion from which the heat medium oil is discharged, the heat storage tube having a slit; a heat-exchange plate having a plurality of insertion holes formed on a lower surface thereof along a longitudinal direction thereof; a plurality of solar modules each including a solar panel having a plurality of solar cells on a front surface of the solar panel, and a heat-exchange panel laminated on a rear surface of the solar panel; and a plurality of heat collection modules each including a heat-exchange block and a heat collection tube.

4 Claims, 5 Drawing Sheets

(56) References Cited

U.S. PATENT DOCUMENTS

2010/0199973 A1\* 8/2010 Hook ..................... F24S 10/95
  126/714

FOREIGN PATENT DOCUMENTS

| CN | 107990565 | \* | 5/2018 |
| KR | 10-2010-0128154 A | | 12/2010 |
| KR | 10-2088670 B1 | | 5/2020 |
| KR | 10-2020-0096012 A | | 8/2020 |

\* cited by examiner

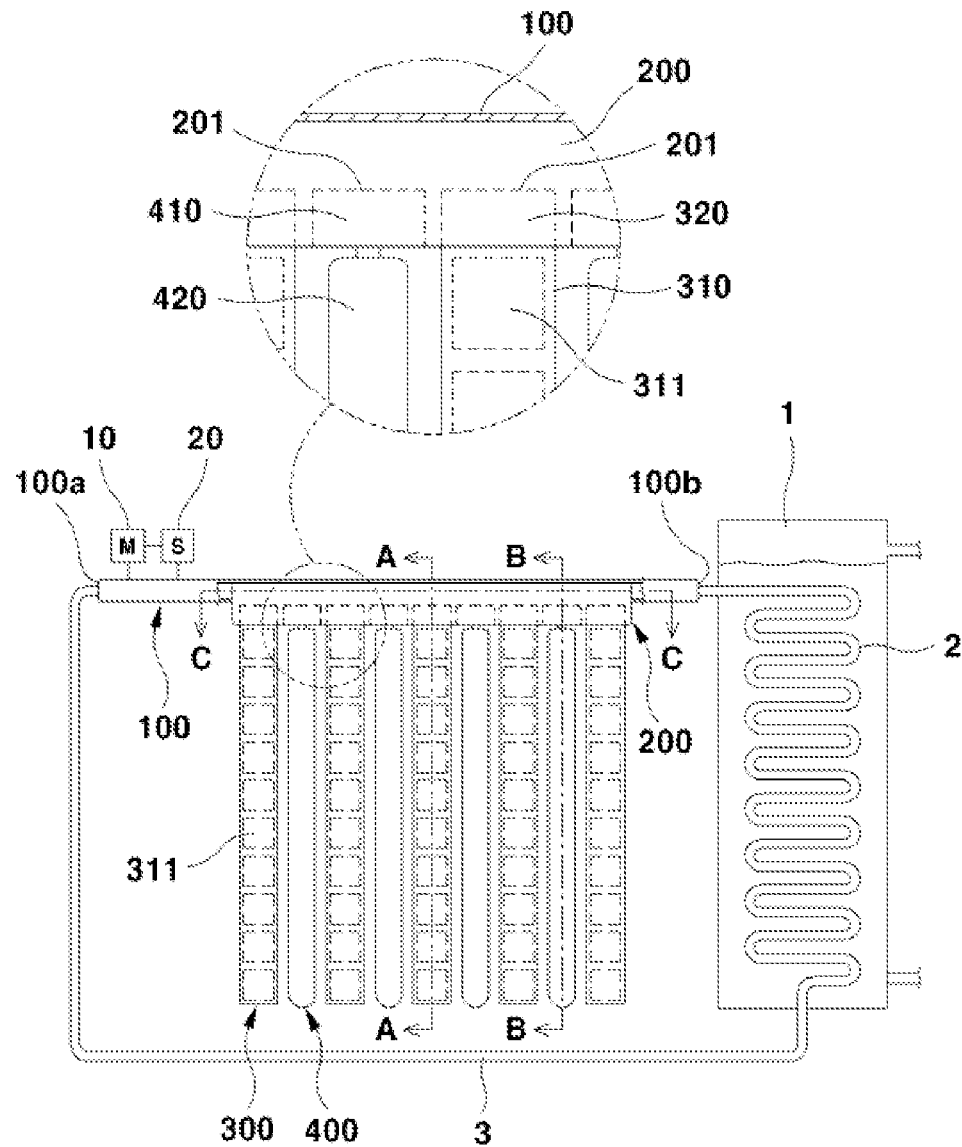
[FIG. 1]

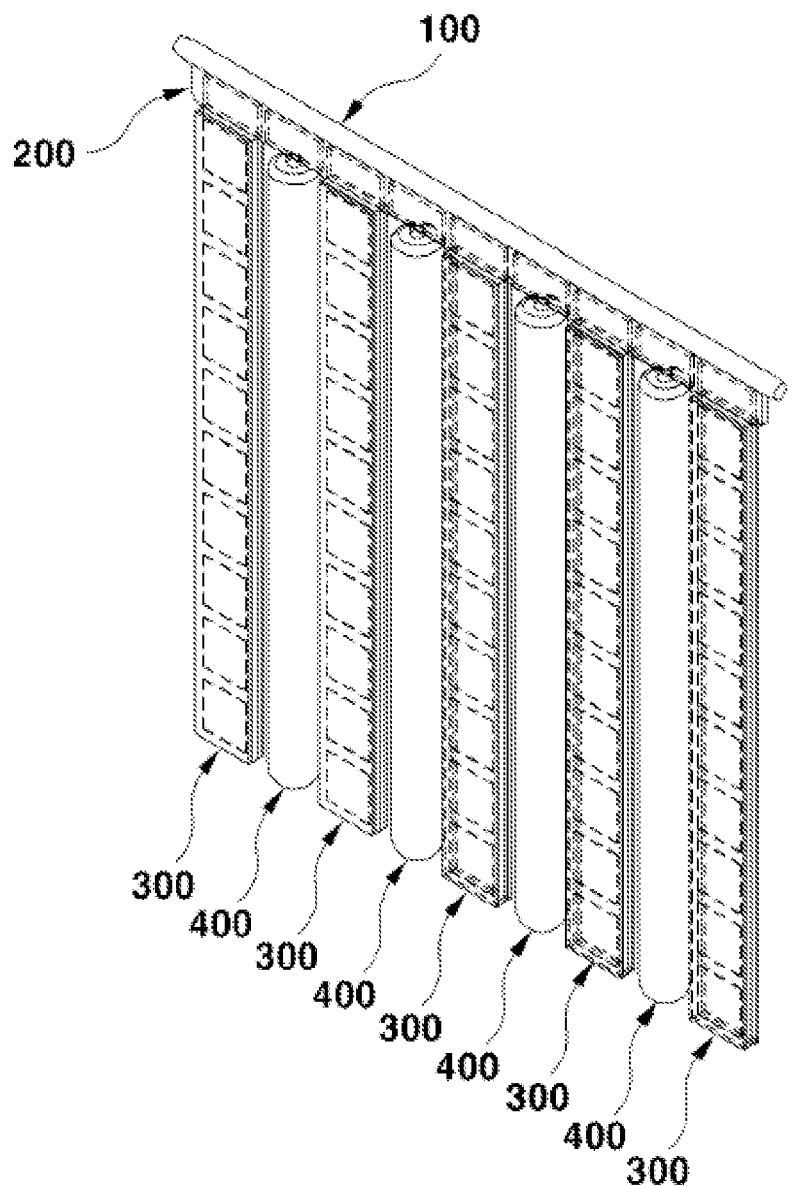

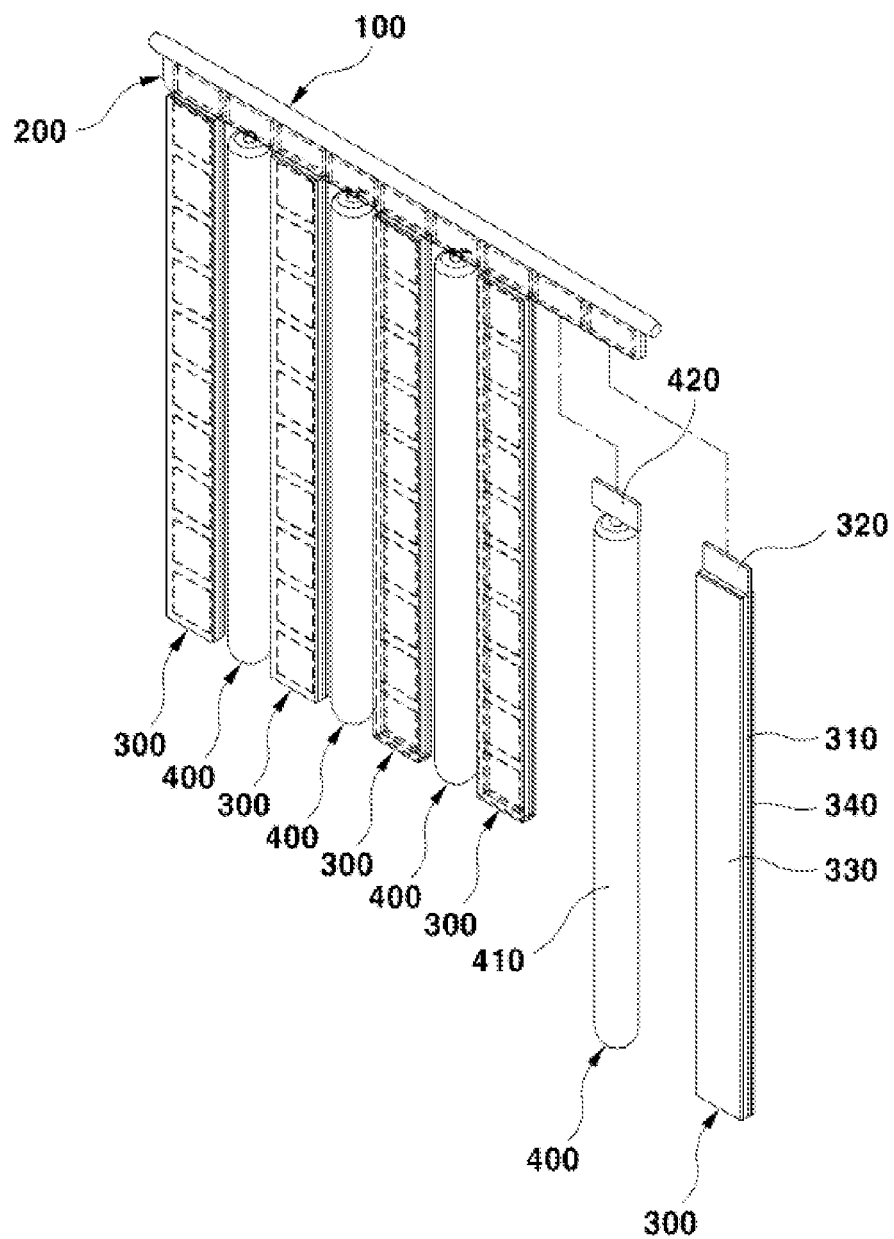
[FIG. 3]

[FIG. 4]
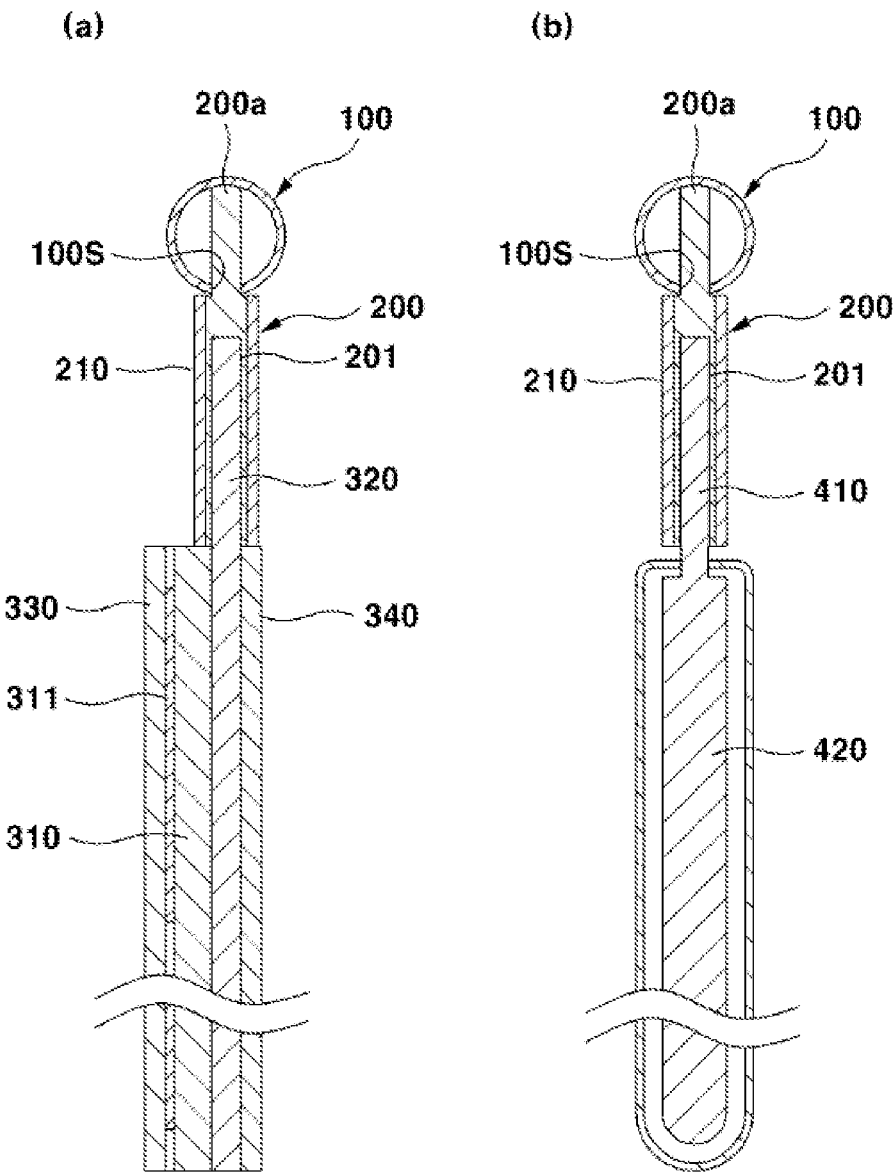

[FIG. 5]
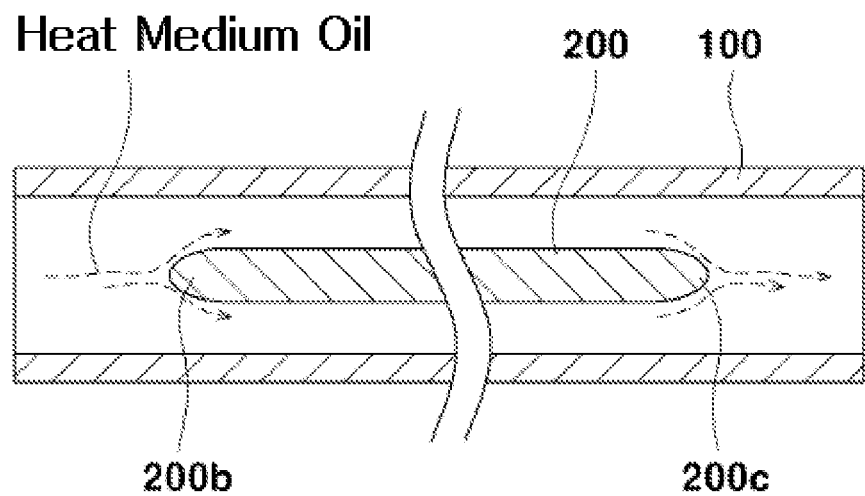

COMPLEX ENERGY GENERATION DEVICE USING SUNLIGHT AND SOLAR HEAT

CROSS REFERENCE TO RELATED APPLICATION

The present application claims priority to Korean Patent Application No. 10-2021-0001871, filed Jan. 7, 2021, the entire contents of which is incorporated herein for all purposes by this reference.

BACKGROUND OF THE INVENTION

Field of the Invention

The present disclosure relates to a complex energy generation device using sunlight and solar heat and, more particularly, to a complex energy generation device using sunlight and solar heat capable of both power generation using sunlight and water heating using solar heat.

Description of the Related Art

Technology for utilization of solar energy is divided into a power generation type using sunlight and a water heating type using solar heat.

Power generation using sunlight has been commercialized after being developed to advanced stages in developed countries including Korea, and research thereof is currently being conducted for efficiency enhancement or generation of high-quality power.

Solar collecting is used to absorb solar radiation to generate hot water so that the hot water is supplied for heating of a building and producing domestic hot water. The solar heat system collects solar heat during the day, stores the heat in the form of hot water in a heat storage tank, and supplies the hot water stored in the heat storage tank when necessary.

Meanwhile, a complex energy generation device that may perform both power generation using sunlight and water heating using solar heat is being developed. As an example, 'Solar heat and sunlight hybrid apparatus' disclosed in Korean Patent Application Publication No. 10-2020-0096012 has been proposed.

However, the solar heat and sunlight hybrid apparatus has a complicated structure and low assemblability, so manufacturing the apparatus is difficult, and the apparatus has a structure in which it is difficult to replace each solar heat collector and photovoltaic collector separately from each other, so maintenance thereof is difficult.

DOCUMENTS OF RELATED ART (Patent Document 1) Korean Patent Application Publication No. 10-2020-0096012 (2020 Aug. 11)

SUMMARY OF THE INVENTION

Accordingly, the present disclosure has been made keeping in mind the above problems occurring in the related art, and the present disclosure is intended to provide a complex energy generation device using sunlight and solar heat to perform both power generation using sunlight and water heating using solar heat.

In order to solve the above technical challenge, according to one aspect of the present disclosure, there is provided a complex energy generation device using sunlight and solar heat, the complex energy generation device including: a heat storage tube having, at a first side portion thereof, an inlet portion into which heat medium oil may flow, and having, at a second side portion thereof, an outlet portion from which the heat medium oil may be discharged, the heat storage tube having a slit at a lower surface thereof along a longitudinal direction thereof; a heat-exchange plate having an upper portion inserted into the heat storage tube through the slit while sealing the slit, and a lower portion exposed to an outside of a lower portion of the heat storage tube, the heat-exchange plate having a plurality of insertion holes formed on a lower surface thereof along a longitudinal direction thereof; a plurality of solar modules each including a solar panel having a plurality of solar cells on a front surface of the solar panel, and a heat-exchange panel laminated on a rear surface of the solar panel and configured such that an upper portion thereof may be closely inserted into at least one of the plurality of insertion holes of the heat-exchange plate; and a plurality of heat collection modules each comprising a heat-exchange block closely inserted into at least one of the plurality of insertion holes of the heat-exchange plate, and a heat collection tube integrally connected to a lower portion of the heat-exchange block.

An inserted portion of the heat-exchange panel inserted into at least one of the insertion holes of the heat-exchange plate and an inserted portion of the heat-exchange block inserted into at least one of the insertion holes of the heat-exchange plate may be configured to be coated with thermal grease prior to being inserted into the insertion holes of the heat-exchange plate, and the heat storage tube, the heat-exchange plate, the heat-exchange panel, and the heat-exchange block may be formed of materials with the same coefficient of thermal expansion.

An upper end surface of the heat-exchange plate inserted into the heat storage tube may be formed in a curved shape to be in close contact with an inner surface of the heat storage tube, and first and second ends of the heat-exchange plate inserted in the heat storage tube may be configured to have streamlined cross-sections.

Insulation materials may be provided on exposed surfaces of both the heat-exchange plate and the heat-exchange panel.

As described above, the complex energy generation device of the present disclosure has an advantage that both power generation using sunlight and water heating using solar heat can be performed.

The complex energy generation device is configured to replace the solar modules and the heat collection modules easily. Accordingly, the complex energy generation device has an advantage that each broken module can be quickly replaced.

Effects of the present disclosure are not limited to the above-mentioned effects, and those skilled in the art will clearly understand other effects not mentioned in consideration of a following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a structure view showing an entire system including a complex energy generation device using sunlight and solar heat according to an embodiment of the present disclosure.

FIG. 2 is a perspective view showing the complex energy generation device using sunlight and solar heat according to the embodiment of present disclosure.

FIG. 3 is a partially exploded-perspective view showing the complex energy generation device using sunlight and solar heat according to the embodiment of present disclosure.

FIG. 4 illustrates sectional views (A) and (B) showing a section A-A and a section B-B in FIG. 1.

FIG. 5 is a sectional view showing a section C-C in FIG. 1.

DETAILED DESCRIPTION OF THE INVENTION

The present disclosure may be embodied in many different forms without departing from the spirit and significant characteristics of the present disclosure. Therefore, the embodiment of the present disclosure is disclosed only for illustrative purposes and should not be construed as limiting the present disclosure.

It will be understood that, although the terms first, second, etc. may be used herein to describe various elements, these elements should not be limited by these terms.

These terms are only used to distinguish one element, from another element. For instance, a first element discussed below could be termed a second element without departing from the teachings of the present disclosure. Similarly, the second element could also be termed the first element The term "and/or" includes any and all combinations of one or more of the associated listed items.

It will be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

The terminology used herein is for the purpose of describing a particular embodiment only and is not intended to be limiting. As used herein, the singular forms "a", "an" and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this present disclosure belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, a preferred embodiment of the present disclosure will be described in detail with reference to the accompanying drawings, the same reference numerals will be used throughout the drawings and the description to refer to the same or like elements or parts, and a detailed description of those elements will be omitted.

In the following description, when the functions of conventional elements and the detailed description of elements related with the present disclosure may make the gist of the present disclosure unclear, a detailed description of those elements will be omitted.

An entire system including a complex energy generation device using sunlight and solar heat (hereinbelow, the device will refer to 'complex energy generation device') according to an embodiment of the present disclosure includes a heat storage tank 1, a heating tube 2, a transfer tube 3, and a complex energy generation device 100, 200, 300, as shown in FIG. 1.

The heat storage tank 1 is a water reservoir having a predetermined inside space, and an upper portion thereof is connected to a supply port to be supplied with domestic water and a lower portion thereof is connected to a discharge port to discharge hot water.

The heating tube 2 is provided to heat the domestic water in the heat storage tank 1 to generate hot water. The heating tube 2 may be arranged in a zigzag array in the heat storage tank 1.

The transfer tube 3 is a tube connecting a first side portion of the complex energy generation device to the heating tube 2. The transfer tube 3 allows heat medium oil that has passed through the complex energy generation device and the heating tube 2 to flow into the complex energy generation device again, so that the heat medium oil is circulated.

Meanwhile, the complex energy generation device is a device configured to perform both power generation using sunlight and water heating using solar heat. Hereinbelow, the complex energy generation device will be described in detail with reference to accompanying drawings.

As shown in FIG. 1, the complex energy generation device includes: a heat storage tube 100, a heat-exchange plate 200, a plurality of solar modules 300, and a plurality of heat collection modules 400.

The heat storage tube 100 has an inlet portion at a first side portion thereof to receive the heat medium oil and an outlet portion at a second side portion thereof to discharge the heat medium oil.

As shown in FIG. 1, the first side portion of the heat storage tube 100 is connected to the transfer tube 3 and the second side portion of the heat storage tube 100 is connected to the heating tube 2. The heat medium oil flowing into the heat storage tube 100 through the transfer tube 3 performs heat-exchange and then is discharged into the heating tube 2.

A lower surface of the heat storage tube 100 has a slit 100S formed in a longitudinal direction thereof. An upper portion of the heat-exchange plate 200 is inserted into the slit 100S.

In the structure of the heat storage tube 100 as described above, the heat medium oil may perform heat-exchange while circulated into the heat storage tube 100 and being brought into contact with the heat-exchange plate 200.

The heat-exchange plate 200 transmits heat to the heat medium oil circulated in the heat storage tube 100. The upper portion of the heat-exchange plate 200 is inserted into the heat storage tube 100 through the slit 100S while sealing the slit 100S, and a lower portion of the heat-exchange plate 200 is exposed to the outside of a lower portion of the heat storage tube 100.

The form of the slit 100S and the sectional form of the heat-exchange plate 200 are formed identically. Accordingly, the slit 100S may be sealed when the upper portion of the heat-exchange plate 200 is inserted into the slit 100S. In order to increase a sealing force between surfaces of the slit 100S and the heat-exchange plate 200, an O-ring or a separate sealing means may be provided.

As shown in FIGS. 4A and 4B, an upper end surface 200*a* of the heat-exchange plate 200 inserted into the heat storage tube 100 through the slit 100S is extended to reach an inner surface of the heat storage tube 100. The upper end surface 200*a* of the heat-exchange plate 200 is formed in a curved surface so as to be in close contact with the inner surface of the heat storage tube 100.

As shown in FIG. 5, it is preferable that a first end portion 200*b* and a second end portion 300*c* of the heat-exchange plate 200 inserted into the heat storage tube 100 through the slit 100S have streamlined cross-sections, so that the heat medium oil may be efficiently circulated.

As shown in FIG. 1, a plurality of insertion holes 201 is formed at a lower surface of the heat-exchange plate 200 at equal intervals along a longitudinal direction of the heat-exchange plate 200. The solar modules 300 and the heat collection modules 400 are inserted into the plurality of insertion holes 201 with an alternative arrangement.

As shown in FIGS. 4A and 4B, it is preferable that insulation materials 210 cover exposed surfaces of the heat-exchange plate 200 the outside of the heat storage tube 100.

The heat-exchange plate 200 described above may be formed of a material with the same coefficient of thermal expansion as the heat storage tube 100 in order to prevent a gap formed between the slit 100S and the heat-exchange plate 200 due to a difference in the coefficient of thermal expansion.

With the structure of the heat-exchange plate 200 described above, heat of the solar modules 300 and the heat collection modules 400 is transmitted to the heat medium oil circulated in the heat storage tube 100, so that heat-exchange may be achieved.

Each of the solar modules 300 is a module having a plurality of solar cells 311 generating energy using sunlight. Specifically, as shown in FIG. 4A, the solar module 300 includes: a solar panel 310 having a front surface with the plurality of solar cells 311; a heat-exchange panel 320 laminated on a rear surface of the solar panel 310 and having an upper portion closely inserted into at least one of the plurality of insertion holes 201 of the heat-exchange plate; a transparent protective glass 330 laminated on a front surface of the solar panel 310 to protect the front surface of the solar panel 310; and an insulation material 340 provided on an exposed rear surface of the heat-exchange panel 320.

The solar cells 311 provided on the solar panel 310 are an element generating energy using sunlight, and are configured to supply generated electric energy to the outside through a separate electric wiring (not shown) or to store the generated electric energy in a battery.

When the solar panel 310 receives sunlight, the temperature of the solar panel 310 gradually is increased. When the temperature of the solar panel 310 is increased above a predetermined temperature, efficiency of energy generation may be reduced.

Therefore, in order to prevent the temperature of the solar panel 310 from being increased above the predetermined temperature, the heat-exchange panel 320 is in close contact with the rear surface of the solar panel 310 and serves to transmit heat of the solar panel 310 to the heat-exchange plate 200.

With the above structure, the heat of the solar panel 310 is transmitted to the heat-exchange plate 200 through the heat-exchange panel 320 and heat-exchange is performed between the heat-exchange plate 200 receiving the heat and the heat medium oil circulated in the heat storage tube 100. Therefore, the temperature of the solar panel 310 is prevented from being increased above the predetermined temperature and the efficiency of energy generation may be maintained.

Meanwhile, a portion of the heat-exchange panel 320 inserted into one of the insertion holes 201 of the heat-exchange plate 200 is coated with thermal grease and then is inserted into the insertion hole 201 of the heat-exchange plate 200, whereby the efficiency of heat transfer between the heat-exchange panel 320 and the heat-exchange plate 200 may be increased. The thermal grease increases a coupling force between the heat-exchange panel 320 and the heat-exchange plate 200 after hardening.

The heat-exchange panel 320 described above may be formed of a material with the same coefficient of thermal expansion as the heat-exchange plate 200 in order to prevent a gap formed between the insertion hole 201 and the heat-exchange panel 320 due to a difference in the coefficient of thermal expansion.

According to the structure of the solar module 300 as described above, the solar module 300 may be configured to prevent the temperature of the solar panel 310 constituting the solar module 300 from being increased above the predetermined temperature and to transmit solar heat to the heat medium oil.

Each of the heat collection modules 400 is an element for heating domestic water in the heat storage tank 1 using solar heat. Specifically, as shown in FIG. 4B, the heat collection module 400 includes: a heat-exchange block 410 closely inserted into at least one of the plurality of insertion holes 201 of the heat-exchange plate; and a heat collection tube 420 integrally connected to a lower portion of the heat-exchange block 410.

The heat-exchange block 410 transmits solar heat collected in the heat collection tube 420 to the heat-exchange plate 200.

Solar heat collected in the heat collection tube 420 is transmitted to the heat-exchange plate 200 through the heat-exchange block 410, and heat-exchange is performed between the heat-exchange plate 200 receiving the heat and the heat medium oil circulated in the heat storage tube 100.

The heat collection tube 420 is an element provided to collect solar heat. In general, the heat collection tube 420 may consist of a conventional vacuum tube such as a solar vacuum tube, solar glass vacuum tube, solar hot water vacuum tube, etc.

An inserted portion of the heat-exchange block 410 inserted into at least one of the insertion holes 201 of the heat-exchange plate 200 is coated with thermal grease prior to being inserted into the insertion holes 201 of the heat-exchange plate 200. Accordingly, the efficiency of heat transfer between the heat-exchange block 410 and the heat-exchange plate 200 may be increased. The thermal grease increases a coupling force between the heat-exchange block 410 and the heat-exchange plate 200 after hardening.

The heat-exchange block 410 described above may be formed of a material with the same coefficient of thermal expansion as the heat-exchange plate 200 in order to prevent a gap formed between the insertion holes 201 and the heat-exchange block 410 due to a difference in the coefficient of thermal expansion.

According to the structure of the heat collection modules 400 described above, heat of the heat collection tube 420 heated by solar heat may be transmitted to the heat medium oil through the heat-exchange plate 200.

According to the embodiment of the present disclosure, when any one module of the solar modules 300 and the heat collection modules 400 is broken during the use in the assembled state as shown in FIG. 2, the complex energy generation device may be repaired with a simple process such that the broken module is separated and then removed from the insertion holes 201 of the heat-exchange plate 200 and is replaced with a new module, so there is an advantage of being able to repair quickly.

Although a preferred embodiment of the present disclosure has been described for illustrative purposes with respect to the accompanying drawings, those skilled in the art will appreciate that various modifications, additions and substitutions are possible, without departing from the scope and spirit of the present disclosure as disclosed in the accompanying claims. Therefore, the scope and spirit of the present disclosure should be interpreted by the accompanying claims disclosed with the various modifications.

What is claimed is:

1. A complex energy generation device using sunlight and solar heat, the complex energy generation device comprising:
    a heat storage tube having, at a first side portion thereof, an inlet portion into which heat medium oil flows, and having, at a second side portion thereof, an outlet portion from which the heat medium oil is discharged, the heat storage tube having a slit at a lower surface thereof along a longitudinal direction thereof;
    a heat-exchange plate having an upper portion inserted into the heat storage tube through the slit while sealing the slit, and a lower portion exposed to an outside of a lower portion of the heat storage tube, the heat-exchange plate having a plurality of insertion holes formed on a lower surface thereof along a longitudinal direction thereof;
    a plurality of solar modules each comprising a solar panel having a plurality of solar cells on a front surface of the solar panel, and a heat-exchange panel laminated on a rear surface of the solar panel and configured such that an upper portion thereof is closely inserted into at least one of the plurality of insertion holes of the heat-exchange plate; and
    a plurality of heat collection modules each comprising a heat-exchange block closely inserted into at least one of the plurality of insertion holes of the heat-exchange plate, and a heat collection tube integrally connected to a lower portion of the heat-exchange block.

2. The complex energy generation device of claim 1, wherein an inserted portion of the heat-exchange panel inserted into at least one of the insertion holes of the heat-exchange plate and an inserted portion of the heat-exchange block inserted into at least one of the insertion holes of the heat-exchange plate are configured to be coated with thermal grease prior to being inserted into the insertion holes of the heat-exchange plate, and
    the heat storage tube, the heat-exchange plate, the heat-exchange panel, and the heat-exchange block are formed of materials with the same coefficient of thermal expansion.

3. The complex energy generation device of claim 1, wherein an upper end surface of the heat-exchange plate inserted into the heat storage tube is formed in a curved shape to be in close contact with an inner surface of the heat storage tube, and
    first and second ends of the heat-exchange plate inserted in the heat storage tube are configured to have streamlined cross-sections.

4. The complex energy generation device of claim 1, wherein insulation materials are provided on exposed surfaces of both the heat-exchange plate and the heat-exchange panel.

\* \* \* \* \*